(12) United States Patent
Tignanelli

(10) Patent No.: US 11,565,615 B2
(45) Date of Patent: Jan. 31, 2023

(54) ANTI-MICROBIAL, PARTITION DIVIDER ASSEMBLY FOR A CART SUCH AS A GOLF CART

(71) Applicant: Global IP Holdings, LLC, Sterling Heights, MI (US)

(72) Inventor: Joseph Richard Tignanelli, Rochester Hills, MI (US)

( * ) Notice: Subject to any disclaimer, the term of this patent is extended or adjusted under 35 U.S.C. 154(b) by 54 days.

(21) Appl. No.: 17/242,934

(22) Filed: Apr. 28, 2021

(65) Prior Publication Data

US 2021/0331613 A1 Oct. 28, 2021

Related U.S. Application Data

(60) Provisional application No. 63/016,654, filed on Apr. 28, 2020.

(51) Int. Cl.
*B32B 3/24* (2006.01)
*B32B 27/08* (2006.01)
(Continued)

(52) U.S. Cl.
CPC .............. *B60N 2/91* (2018.02); *B32B 3/08* (2013.01); *B32B 3/266* (2013.01); *B32B 27/08* (2013.01); *B60R 21/02* (2013.01); *B32B 3/06* (2013.01); *B32B 2250/03* (2013.01); *B32B 2250/24* (2013.01); *B32B 2250/40* (2013.01); *B32B 2307/10* (2013.01); *B32B 2307/41* (2013.01); *B32B 2307/412* (2013.01); *B32B 2307/414* (2013.01); *B32B 2307/7145* (2013.01); *B32B 2307/726* (2013.01); *B32B 2605/00* (2013.01); *B32B 2605/006* (2013.01); *B60R 21/026* (2013.01); *Y10S 280/05* (2013.01); *Y10S 428/906* (2013.01); *Y10S 428/907* (2013.01);
(Continued)

(58) Field of Classification Search
None
See application file for complete search history.

(56) References Cited

U.S. PATENT DOCUMENTS 3,042,034 A * 7/1962 Gruenewaelder ...... A41D 13/11
128/206.12
3,931,994 A * 1/1976 Palmiter ............ B60H 1/00592
280/748
(Continued)

FOREIGN PATENT DOCUMENTS

CA 2410329 A1 * 4/2004 ............. B60R 21/12
CN 101105938 A * 1/2008
(Continued)

OTHER PUBLICATIONS

Fitch et al., Modal vocal fundamental frequency of young adults, Oct. 1970, Otolaryngology, vol. 92, Issue 4, pp. 379-382 (Year: 1970).*
(Continued)

*Primary Examiner* — Jeffrey A Vonch
(74) *Attorney, Agent, or Firm* — Brooks Kushman P.C.

(57) ABSTRACT

An anti-microbial partition divider assembly for a cart such as a golf cart is provided. The cart has a passenger seating area, including at least one seat, a roof and a floor. The assembly includes a flexible or beam-rigid partition divider having a substrate layer made of a material which prevents airborne liquid droplets from traveling therethrough.

20 Claims, 3 Drawing Sheets

(51) Int. Cl.
*B60R 21/02* (2006.01)
*B60N 2/90* (2018.01)
*B32B 3/26* (2006.01)
*B32B 3/08* (2006.01)
*B32B 3/06* (2006.01)

(52) U.S. Cl.
CPC ............... *Y10T 428/24008* (2015.01); *Y10T 428/24322* (2015.01); *Y10T 428/24331* (2015.01)

(56) References Cited

U.S. PATENT DOCUMENTS

| | | | | |
|---|---|---|---|---|
| 5,054,837 | A * | 10/1991 | Chapman | B60R 7/043 49/463 |
| 5,206,956 | A * | 5/1993 | Olson | G02C 7/16 128/857 |
| 5,238,282 | A * | 8/1993 | Watson | B64D 11/0023 296/24.41 |
| 5,259,656 | A * | 11/1993 | Carroll | B60J 11/00 160/237 |
| 5,429,290 | A | 7/1995 | Greene, Jr. | |
| 5,971,487 | A * | 10/1999 | Passehl | B60N 2/91 297/464 |
| 6,105,653 | A * | 8/2000 | Armstrong | B60H 1/00592 296/141 |
| 6,212,805 | B1 * | 4/2001 | Hill | G09F 13/12 40/442 |
| 6,260,903 | B1 | 7/2001 | von der Heyde | |
| 8,272,674 | B2 | 9/2012 | Vance | |
| 2003/0090118 | A1 * | 5/2003 | Murray | B60R 21/026 296/24.4 |
| 2008/0276371 | A1 * | 11/2008 | Stowers | A47G 5/00 5/513 |
| 2009/0173569 | A1 * | 7/2009 | Levit | E04B 9/04 181/290 |
| 2009/0224103 | A1 * | 9/2009 | Neumann | B64D 11/0023 244/129.1 |
| 2009/0314696 | A1 * | 12/2009 | Trentacosta | G05D 23/19 210/97 |
| 2010/0068456 | A1 * | 3/2010 | Hsu | H05K 5/0243 428/137 |
| 2010/0239625 | A1 * | 9/2010 | Puckett | A41D 13/1115 424/402 |
| 2011/0100749 | A1 * | 5/2011 | Nonogi | B32B 27/12 181/291 |
| 2012/0068490 | A1 * | 3/2012 | Vance | B60N 2/91 296/24.46 |
| 2013/0153331 | A1 * | 6/2013 | Schneider | E04B 1/8409 181/292 |
| 2013/0213588 | A1 * | 8/2013 | Wu | B60H 1/00592 160/369 |
| 2015/0267402 | A1 * | 9/2015 | Borrelli | E04B 1/84 216/48 |
| 2016/0279895 | A1 * | 9/2016 | Marjanovic | B32B 17/06 |
| 2016/0326748 | A1 * | 11/2016 | Lath | B32B 17/10247 |
| 2016/0355109 | A1 | 12/2016 | Geraty | |
| 2017/0044761 | A1 * | 2/2017 | Flotre | G10K 11/162 |
| 2017/0354143 | A1 * | 12/2017 | Rolfe | B32B 27/36 |
| 2018/0160748 | A1 * | 6/2018 | Yoshida | A62B 23/025 |
| 2018/0245336 | A1 * | 8/2018 | Park | B27K 3/15 |
| 2019/0232993 | A1 * | 8/2019 | Riffle | B62B 7/008 |
| 2019/0336626 | A1 * | 11/2019 | Maa | A61L 2/088 |
| 2020/0079057 | A1 * | 3/2020 | Null | B32B 17/10788 |
| 2020/0184942 | A1 * | 6/2020 | Hakuta | B32B 15/04 |
| 2020/0199866 | A1 * | 6/2020 | Aten | B32B 3/266 |
| 2021/0054194 | A1 * | 2/2021 | Ding | C08L 69/00 |
| 2021/0331629 | A1 * | 10/2021 | Marroquin | B60R 13/0823 |
| 2021/0347324 | A1 * | 11/2021 | Borgsdorf | B60R 21/06 |

FOREIGN PATENT DOCUMENTS

| | | | | |
|---|---|---|---|---|
| CN | 101368470 | A * | 2/2009 | |
| CN | 204808875 | U * | 11/2015 | |
| CN | 106042468 | A * | 10/2016 | |
| CN | 205936229 | U * | 2/2017 | |
| DE | 3245196 | A1 * | 6/1984 | ....... A61F 13/51405 |
| DE | 102011109294 | A1 * | 2/2013 | ............ B60R 21/06 |
| EP | 386622 | A * | 9/1990 | ............ A01N 25/34 |
| EP | 388355 | A * | 9/1990 | ............ E04B 1/86 |
| EP | 1060874 | A1 * | 12/2000 | ............ B32B 15/01 |
| EP | 1657121 | A1 * | 5/2006 | ............ B60R 21/12 |
| FR | 2881765 | A1 * | 8/2006 | ........ B60R 13/0815 |
| FR | 3070940 | A1 * | 3/2019 | ........ B60R 13/0823 |
| JP | 02283448 | A * | 11/1990 | ............ A01N 25/34 |
| JP | 04275142 | A * | 9/1992 | ............ B42D 25/29 |
| JP | 11100943 | A * | 4/1999 | |
| JP | 2003191361 | A * | 7/2003 | ............ B42D 25/29 |
| JP | 3152493 | U * | 8/2009 | |
| JP | 2011042095 | A * | 3/2011 | |
| WO | WO-2007007669 | A1 * | 1/2007 | ............ A41D 13/11 |
| WO | WO-2008007447 | A1 * | 1/2008 | ............ E01F 8/0064 |
| WO | WO-2013143007 | A1 * | 10/2013 | ............ B32B 29/002 |
| WO | WO-2021214622 | A1 * | 10/2021 | ............ E04B 1/86 |

OTHER PUBLICATIONS

Safe Wedge Facebook Page, Apr. 22, 2020, <https://www.facebook.com/SafeWedge/> (Year: 2020).*

Safe Wedge Introduction, Apr. 28, 2020, <https://www.youtube.com/watch?v=Oej55yBC3sU> (Year: 2020).*

Installation Instructions for Safe Wedge Yamaha Drive & Drive2, May 2020 (Year: 2020).*

Machine Translation of JP-3152493-U, Aug. 2009 (Year: 2009).*

HBosler, 5 Easy DIY Modern Room Dividers, Dec. 2017 (Wayback), Mid Century Modern Groovy, <https://www.midcenturymoderngroovy.com/?p=8896> (Year: 2017).*

Jong Jin Park, et al., Giant Acoustic Concentration by Extraordinary Transmission in Zero-Mass Metamaterials, Institute of Physics and Applied Physics, Yonsei University, Seoul 120-749, Korea, Department of Physics, Ewha Womans University, Seoul 120-750, Korea, Division of Applied Physics, Faculty of Engineering, Hokkaido University, Sapporo 060-8628, Japan, published Jun. 13, 2013.

* cited by examiner

US 11,565,615 B2

ANTI-MICROBIAL, PARTITION DIVIDER ASSEMBLY FOR A CART SUCH AS A GOLF CART

CROSS-REFERENCE TO RELATED APPLICATIONS

This application claims the benefit of U.S. Provisional Patent Application No. 63/016,654, filed Apr. 28, 2020, the disclosure of which is hereby incorporated in its entirety by reference herein.

TECHNICAL FIELD

At least one embodiment of the present invention generally relates to partition dividers for carts and, in particular, to antimicrobial partition dividers for carts, such as golf carts.

Overview

A number of U.S. Patent Documents disclose golf cart covers intended to protect both the passenger and the cargo from the elements. For example, U.S. Pat. No. 5,429,290 issued Jul. 4, 1995 to Greene, Jr. and U.S. Pat. No. 5,259,656 issued to Carroll Nov. 9, 1993, disclose golf cart covers intended to protect both the passengers and the cargo from the elements.

A number of U.S. Patent Documents disclose partitions or dividers which extend between vehicle passengers such as children. For example, U.S. Pat. No. 5,971,487 discloses a substantially rectangular, vertically-extending divider made of soft compressible material and having a height approximately equal to the height of the rear backrest of a motor vehicle attaches to the rear seat by employing the rear seat center belt. A slot at the back of the seat divider receives the center seat belt such that when secured by the seat belt, the soft material of the divider is compressed against the rear seat providing secure retention. The dimension of the seat divider extends forwardly through the interior cabin space between the backrests of individual front seats of the vehicle, and the width of the divider is substantially equal to the space between the front seat backrests. The divider includes a notch at the front bottom corner which receives and rests upon a center console of the vehicle. An internal rigid planar foam core, which extends substantially across the entire side profile of the divider, provides structural integrity to the divider. The divider further includes a cover that may include pockets of various sizes and shapes along its exterior surface.

U.S. Pat. No. 6,260,903 discloses a portable partition for use in an automobile having a seat with a seat bench and a seat backrest. The partition includes a seat plate that has first and second portions that rest on the seat bench. The partition also includes a partition plate that has a bottom edge connected to the seat plate between the first and second seat-plate portions. When the seat plate is disposed upon the seat bench, the partition plate is disposed substantially orthogonally of the seat bench. The partition plate typically is constructed of a substantially transparent material so that the driver's view is not obstructed by the partition plate. The partition may also have a hinge joining the first and second portions. The hinge permits the seat plate to more closely fit the seat bench, particularly when a child is seated on a cushion or a child seat placed on top of one or both of the portions of the seat plate. The partition plate typically extends vertically so that its top edge is near to the ceiling of the automobile, and its back edge is shaped to conform to the shape of the seat back. Thus, children respectively seated on a cushion or child seat on top of the two portions of the seat plate are separated from each other by the partition. The partition plate may have a seat-belt passage for receiving an automobile seat belt. Fastening the seat belt through the seat-belt passage secures the partition plate to the automobile seat.

U.S. Pat. No. 8,272,674 discloses a partition for use in vehicles having interior cabin space including at least one row of seats includes a deformable frame and at least one attachment device. The deformable frame is covered at least partially with a fabric material. The at least one attachment device attaches the deformable frame to a portion of a vehicle. Upon installation in a vehicle, the deformable frame separates a first passenger seat of the vehicle from a second passenger seat in the same row.

U.S. Published Application No. 2016/0355109 discloses a partition assembly for a motor vehicle seat comprises a stabilizer sub-assembly configured to connect to the motor vehicle seat, and a panel sub-assembly connected to the stabilizer sub-assembly. The stabilizer sub-assembly can comprise one or more flexible rods connected to a headrest. The panel sub-assembly can comprise a fabric or rigid sheet braced by a plurality of flexible rods. Additionally, the partition can further comprise a strap connected to the panel sub-assembly for wrapping around a bottom of the vehicle seat.

To maintain an active infectious disease in a human population, a pathogen must be transmitted from one host or source to another. Transmission occurs by four main routes: airborne, contact, vehicle, and vector-borne.

Airborne Transmission

Because air is not a suitable medium for the growth of a pathogen, any pathogen that is airborne must have originated from a source such as humans, other animals, plants, soil, food, or water. In airborne transmission the pathogen is truly suspended in the air and travels over a meter or more from the source to the host. The pathogen can be contained within droplet nuclei or dust. Droplet nuclei are small particles, 1 to 4 μm in diameter, that result from the evaporation of larger particles (10 μm or more in diameter) called droplets. Droplet nuclei can remain airborne for hours or days and travel long distances.

When animals or humans are the source of the airborne pathogen, it usually is propelled from the respiratory tract into the air by an individual's coughing, sneezing, or vocalization.

Aerosols and droplets generated during speech have been implicated in the person-to-person transmission of viruses, and there is current interest in understanding the mechanisms responsible for the spread of Covid-19 by these means. The act of speaking generates oral fluid droplets that vary widely in size, and these droplets can harbor infectious virus particles. Whereas large droplets fall quickly to the ground, small droplets can dehydrate and linger as "droplet nuclei" in the air, where they behave like an aerosol and thereby expand the spatial extent of emitted infectious particles.

The table immediately below summarizes some human airborne pathogens and the diseases they cause in humans.

| Microorganism | Disease |
| --- | --- |
| Viruses | |
| Varicella | Chickenpox |
| Influenza | Flu |
| Rubeola | Measles |
| Rubella | German measles |
| Mumps | Mumps |
| Poliomyelitis | Polio |
| Acute respiratory viruses | Viral pneumonia |
| Pulmonary syndrome hantavirus | Hantavirus pulmonary syndrome |
| Bacteria | |
| *Actinomyces* spp. | Lung infections |
| *Bordetella pertussis* | Whooping cough |
| *Chlamydia psittaci* | Psittacosis |
| *Corynebacterium diphtheriae* | Diphtheria |
| *Mycoplasma pneumoniae* | Pneumonia |
| *Mycobacterium tuberculosis* | Tuberculosis |
| *Neisseria meningitidis* | Meningitis |
| *Streptococcus* spp. | Pneumonia, sore throat |
| Fungi | |
| *Blastomyces* spp. | Lung infections |
| *Coccidioides* spp. | Coccidioidomycosis |
| *Histoplasma capsulatum* | Histoplasmosis |

For purposes of this application, "Antimicrobial" is equivalent to antibacterial, antifungal, antiviral, antiparasitic, microbial, and microbistatic. Most antimicrobial agents control microorganism growth by penetrating the microorganisms thin cellular walls, thereby interrupting the organism metabolic function, and finally killing said organism.

A part, layer or coating having "antimicrobial properties" includes any material that kills or inhibits growth of a microorganism.

As described in Chapter 13 of the *Handbook of Laser Materials Processing* entitled "Hole Drilling," there are two ways of forming apertures or holes using laser beams: percussion drilling and trepanning. Percussion drilling is typically used for hole diameters less than 0.025 in. (0.63 mm), while trepanning is used for drilling holes of larger diameter.

Trepanning

If one uses a rotating optical device, holes up to ≈0.250 in. (6.25 mm) diameter can be laser drilled. So-called "boring heads" rotate the focused laser beam at very high rates. Holes are drilled by either a single pass or multiple passes of the laser beam.

Drilling by trepanning is to cut a hole around its periphery. Depending on the hole diameter, a slug may be produced. Boring heads usually use 2.5-in. focal length lenses and are equipped with gas jets similar to those used for laser cutting applications.

Roundness of the holes produced by boring heads is exact, and repeatability of hole diameter is excellent. Boring-head-hole diameter is established either manually or by use of a programmable controller.

Trepanned holes can also be drilled by interpolation of linear axes, moving either the material or the laser focusing device. Speed of drilling by interpolation is dictated by the size of the linear axes. The linear axes servo system must be properly tuned to produce circular holes. Specialty beam-manipulation devices use very small linear axes to move the focusing device in a circle. The system controller can be programmed to establish desired hole diameters.

Most nonmetals are of one of two types, characterized by their response to exposure to high-energy radiation: those that transform from a solid directly into a vapor without significant liquefaction, and those that transform from solid state into a liquid state before vaporization. Paper is an example of the former; acrylic resin is an example of the latter.

When absorbed by a material, this energy is transformed into energy associated with the motion of atoms or molecules and is capable of being transmitted through solids or fluids by conduction, that is, as heat. Most nonmetals do not conduct heat effectively. Properly applied, the effect of short, high-energy laser pulses is localized to the area of exposure. As such, each pulse of laser energy affects a volume of material consistent with the irradiance of the focuses beam and the specific heat of the material, with negligible impact to material adjacent to the area of exposure.

The total energy required to drill a hole comes from the specific gravity of a material and the volume of material which must be converted from solid to vapor. The rate at which holes can be drilled is determined by the rate at which energy can be input to the material without degrading hole quality.

Hole quality is quantified by the measures of roundness and taper; recast (material that has resolidified in the hole or around the hole entrance); or charring (usually exhibited as a carbonaceous residue). These qualities affect the function of the hole, whether it be air flow, spray pattern, or part fit.

SUMMARY OF EXAMPLE EMBODIMENTS

An object of at least one embodiment of the present invention is to provide an anti-microbial partition divider assembly for a cart such as a golf cart.

In carrying out the above object and other objects of at least one embodiment of the present invention, an antimicrobial partition divider assembly for a cart is provided. The cart has a passenger seating area including at least one seat, a roof and a floor. The assembly comprises a flexible or semi-rigid partition divider including a substrate layer made of a material which prevents airborne liquid droplets from traveling therethrough.

The partition divider may be microperforated and the partition divider may include microperforated outer layers on opposite sides of a microperforated substrate layer to permit sound to bi-directionally travel through the partition divider.

The cart may be a golf cart.

The outer layers are anti-microbial outer layers.

Each of the outer layers may include a two-dimensional array of holes which are offset from each other.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
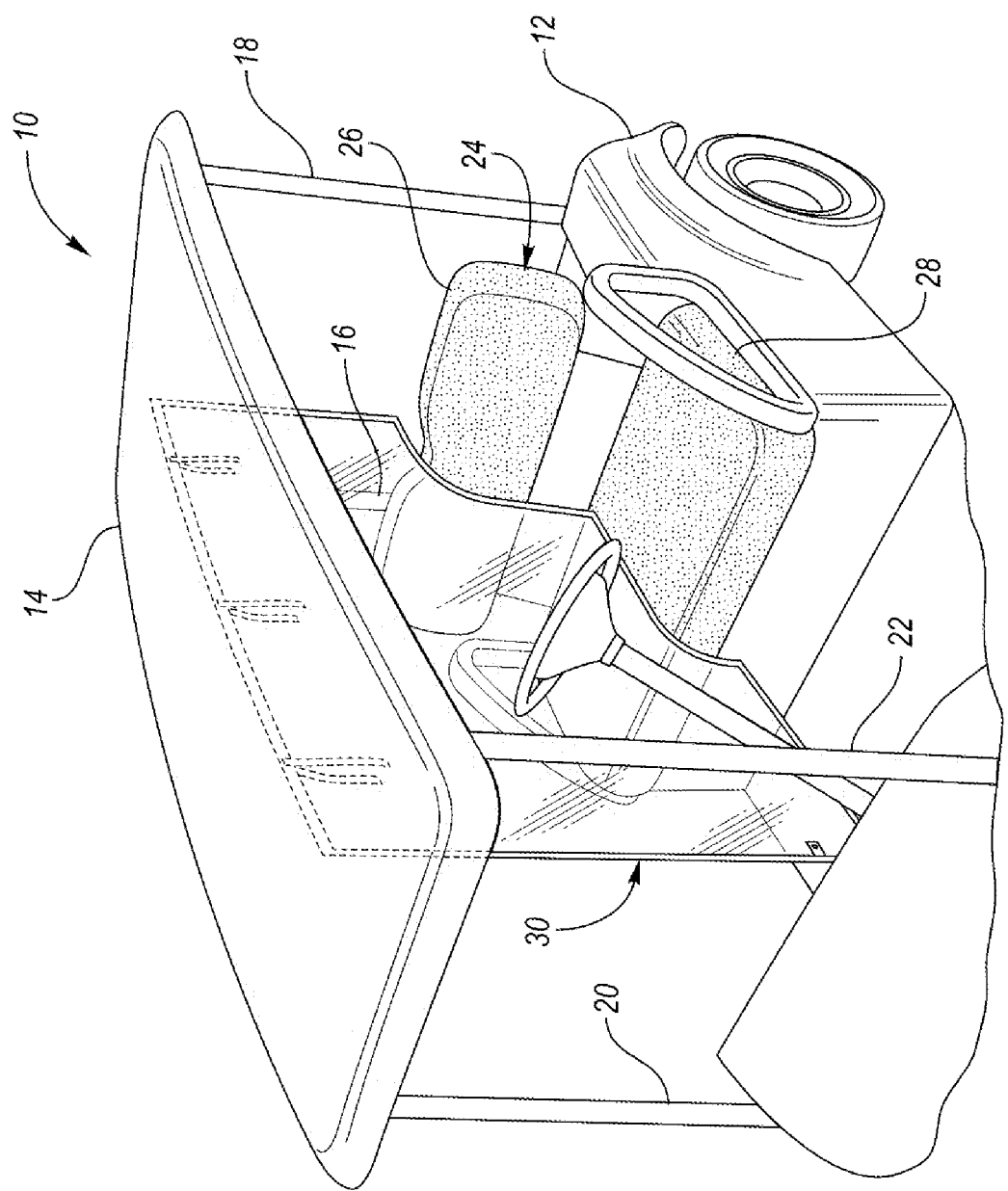
FIG. 1 is a side perspective view, partially broken away, of an antimicrobial partition divider in its unrolled use position and attached inside of a golf cart.

Referring now to FIG. 1, a golf cart, generally indicated at 10, is shown. The cart has a body 12 and a rectangular roof framework 14 supported by four tubular columns 16, 18, 20, 22 embedded in the cart body 12 or attached to attaching brackets (not shown) on the body 12 of the golf cart 10. The columns 16, 18, 20, 22 may be made of a plastic composite embedded in the chassis of the golf cart or held by the brackets. The cart 10 includes a bench seat, generally indicated at 24, which has back and seating parts 26 and 28, respectively.

FIGS. 1 through 4 show one embodiment of an anti-microbial partition divider assembly, generally indicated at 30. In this embodiment the partition divider assembly 30 is cut along its edges to form a shape that aligns with the profile of the interior of the golf cart 10. As shown in FIG. 1, the edges of the partition divider assembly 30 may include edge material to seal and/or reinforce the edges of the assembly 30 to prevent the assembly 30 from being torn or damaged. In one embodiment the bottom edge of the partition divider assembly 30 may additionally include weights to weigh down the assembly 30, so its movement is reduced particularly in windy conditions.

Figure 3:
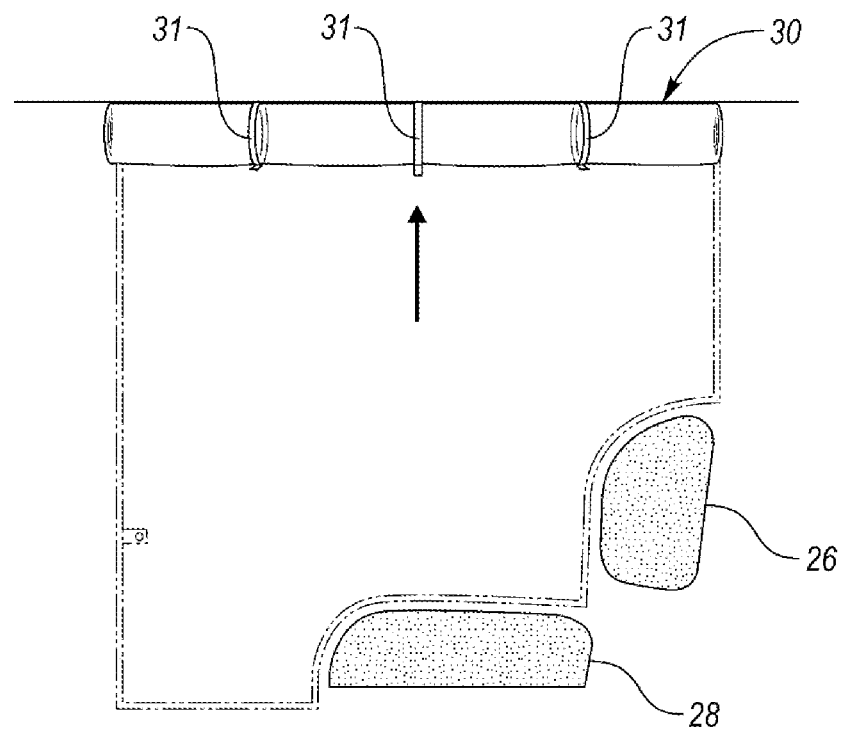
FIG. 3 is a side schematic view, similar to view of FIG. 2, but showing the partition divider in its rolled, sturdy position within the golf cart.

In one embodiment, the partition divider assembly 30 is constructed of a transparent or translucent, flexible plastic material to allow the assembly 30 to be rolled up and stored at the roof 14 of the golf cart 10 when not in use (see FIG. 3). FIG. 3 shows that the partition divider assembly 30 can be rolled-up and secured at the roof 14 of the golf cart 10 by use of hook and loop (Velcro®) fasteners 31. However, other means or fasteners can be used such as snaps, zippers, ties or other forms of fastening mechanisms known in the art.

In one embodiment, the partition divider assembly 30 may be constructed of a semi-rigid material that is removably attached to the golf cart 10. In one embodiment, the partition divider assembly 30 may include clear plastic substrate layer 35 and one or more outer anti-microbial coatings or layers 36 and 38 to form a sandwich structure of the assembly 30. The layers 36 and 38 are capable of cleaning the surrounding air of bacteria, viruses or other microorganisms upon contract therewith.

Figure 2:
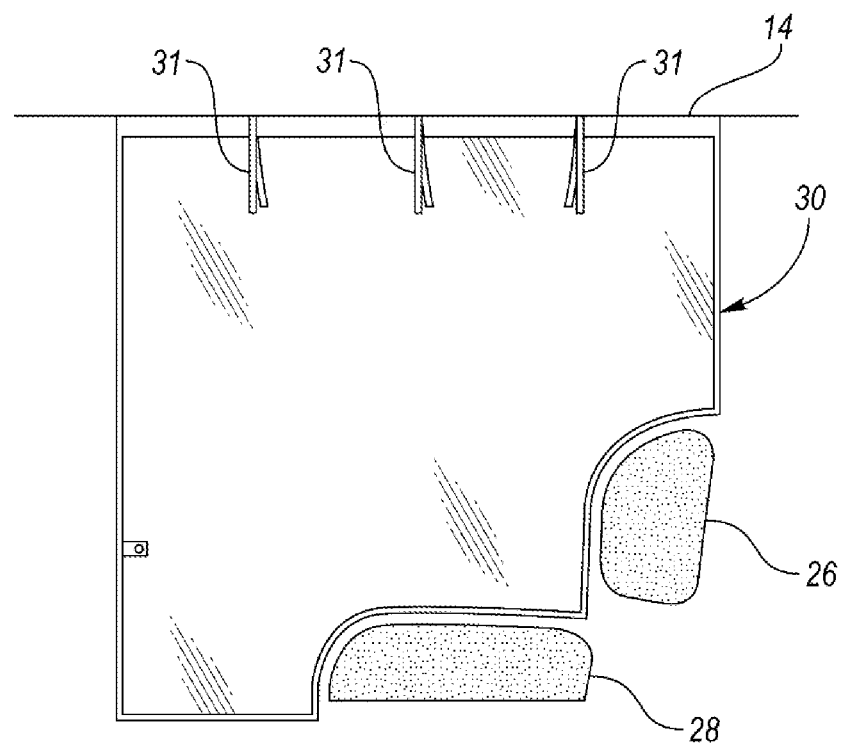
FIG. 2 is a side schematic view of the unrolled partition divider attached to an inner surface of the cart's roof.

FIGS. 1, 2 and 3 show one embodiment of the partition divider assembly 30, which includes hook and loop (Velcro®) straps 31 to removably attach the assembly 30 to the golf cart 10. However, other means of fasteners can be used such as snaps, zippers, ties or other forms of fastening mechanisms known in the art. FIGS. 2 and 3 show a cut-out in the assembly 30 to receive a connector 33 to removable attach the assembly 30 to the golf cart 10. Modifications may also be made to the golf cart 10 to facilitate connecting the assembly 30 to the golf cart 10. In one embodiment, the golf cart 10 may include a snap socket (not shown) for receiving a cap (not shown) from the partition divider assembly 30. In one embodiment, the golf cart 10 may be modified with a bracket (not shown) designed to receive and secure the assembly 30 to the golf cart 10. In one embodiment, the golf cart 10 may include additional holes or rods (not shown) to receive fastening mechanisms (not shown) from the partition divider assembly 30.

In one embodiment, the partition divider assembly 30 may be constructed of translucent or clear plastic material such that riders or passengers have visibility through the assembly 30.

In one embodiment, the assembly 30 may be constructed of opaque material such that riders do not have visibility though the assembly 30.

In one embodiment, the partition divider assembly 30 may be constructed of material capable of filtering out at least some ultraviolet rays to further protect the riders from sun damage.

In one embodiment, the partition divider assembly 30 may include a window (not shown) that can be opened such that riders can exchange items.

In one embodiment, the partition divider assembly 30 may be constructed of material that can be removed, cleaned and reused in the golf cart 10. In one embodiment, the partition divider assembly 30 is constructed of material capable of blocking at least some smoke from an adjacent rider and a seat 24.

Figure 4:
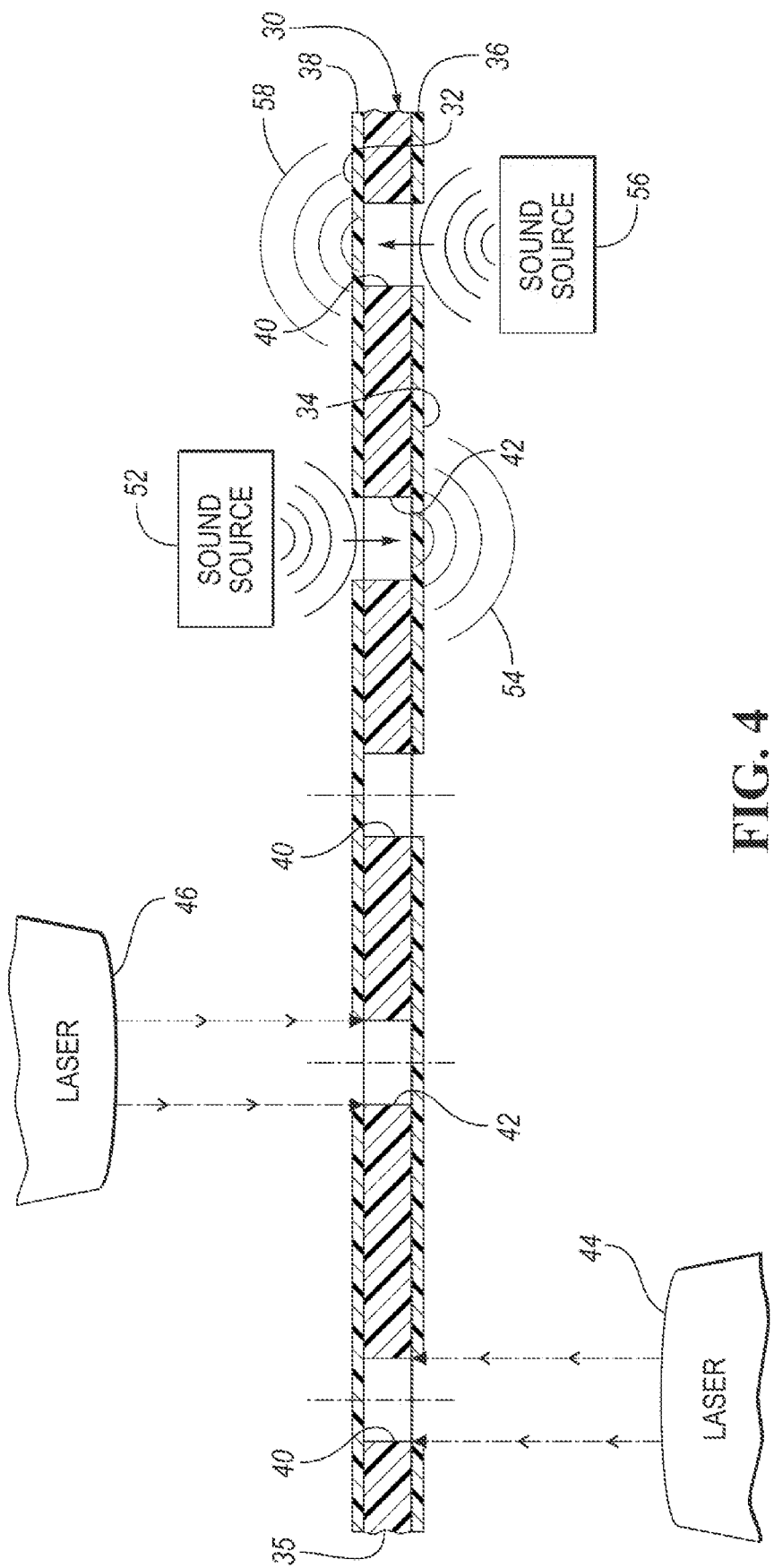
FIG. 4 is a side view, partially broken away and in cross-section, showing the use of different focused laser beams to drill microscopic holes on opposite sides of the partition divider to allow sound to pass bi-directionally through the divider.

Referring now to FIG. 4, there is illustrated laser drilling holes 40 and 42 through outer surfaces 34 and 32, respectively, of the divider 30. The divider assembly 30 includes a clear plastic substrate layer 35 sandwiched between a pair of clear plastic outer film layers 36 and 38 which may be anti-microbial surface layers. The holes 40 and 42 are drilled using lasers 44 and 46. It is to be understood that the lasers 44 and 46 include a lens to provide focused beams of laser energy to drill the holes 40 and 44.

Each of the outer layers 36 and 38 include a two-dimensional array of holes which are offset from each other. Portions of the outer layers 36 and 38 which overlie their respective holes 42 and 40, respectively, vibrate upon receiving sound waves from their respective sound sources 52 and 56, respectively. The holes 42 and the holes 40 form two-dimensional array of holes which are offset from each other.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An anti-microbial partition divider, comprising:
   a microperforated substrate layer having a first plurality of holes extending therethrough and a different second plurality of holes extending therethrough, the substrate layer being made of a material which prevents airborne liquid droplets from travelling;
   a first microperforated outer layer having holes extending therethrough;
   a second microperforated outer layer having holes extending therethrough; and
   wherein the substrate layer is sandwiched between the first and second outer layers and the holes of the first outer layer are offset from the holes of the second outer layer with the holes of the first outer layer being aligned with the first plurality of holes of the substrate layer defining first aligned holes for a sound source from a first direction and having portions of the second outer layer overlying the first aligned holes and the holes of the second outer layer being aligned with the second plurality of holes of the substrate layer defining second aligned holes for a sound source from a second direction and having portions of the first outer layer overlying the second aligned holes such that the portions of the first and second outer layer overlying respective aligned holes vibrate upon receiving sound waves from respective sound sources to permit sound to bi-directionally travel therethrough.

2. The partition divider of claim 1, wherein the outer layers are anti-microbial outer layers capable of cleaning surrounding air of bacteria, viruses, or other microorganisms upon contact therewith.

3. The partition divider of claim 1, wherein the holes of each of the outer layers are arranged in a two-dimensional array.

4. The partition divider of claim 1, wherein the substrate layer and the outer layers are plastic layers.

5. The partition divider of claim 4, wherein the plastic layers are translucent or clear/transparent.

6. An anti-microbial partition divider assembly for a golf cart having a passenger seating area comprising at least one seat, a roof, and a floor, the partition divider assembly comprising:
 a partition divider;
 comprising a microperforated substrate layer having a first plurality of holes extending therethrough and a different second plurality of holes extending therethrough, a first microperforated outer layer having holes extending therethrough, and a second microperforated outer layer having holes extending therethrough, the substrate layer being made of a material which prevents airborne liquid droplets from travelling;
 wherein the substrate layer is sandwiched between the first and second outer layers and the holes of the first outer layer are offset from the holes of the second outer layer with the holes of the first outer layer being aligned with the first plurality of holes of the substrate layer defining first aligned holes for a sound source from a first direction and having portions of the second outer layer overlying the first aligned holes and the holes of the second outer layer being aligned with the second plurality of holes of the substrate layer defining second aligned holes for a sound source from a second direction and having portions of the first outer layer overlying the second aligned holes such that the portions of the first and second outer layer overlying respective aligned holes vibrate upon receiving sound waves from respective sound sources to permit sound to bi-directionally travel therethrough; and
 a fastening means for attachment of the partition divider to the roof, wherein in use the partition divider assembly extends from the roof toward the floor partitioning the passenger seating area.

7. The partition divider assembly of claim 6, wherein the outer layers are anti-microbial layers capable of cleaning surrounding air of bacteria, viruses, or other microorganisms upon contact therewith.

8. The partition divider assembly of claim 6, wherein the substrate layer and the outer layers are plastic layers, wherein the plastic layers are translucent or clear/transparent.

9. The partition divider assembly of claim 6, wherein the fastening means for attachment provides removable attachment.

10. The partition divider assembly of claim 9, wherein the fastening means is hook and loop straps.

11. The partition divider assembly of claim 6, wherein the partition divider is rollable between an unrolled position in which the partition divider is unrolled in use from the roof toward the floor and a rolled position in which the partition divider is rolled up for stowage.

12. A golf cart, comprising:
 a passenger seating area comprising at least one seat, a roof, and a floor;
 a partition divider attached to the roof, the partition divider extends from the roof toward the floor and partitions the passenger seating area;
 the partition divider comprising a microperforated substrate layer having a first plurality of holes extending therethrough and a different second plurality of holes extending therethrough, a first microperforated outer layer having holes extending therethrough, and a second microperforated outer layer having holes extending therethrough, the substrate layer being made of a material which prevents airborne liquid droplets from travelling; and
 wherein the substrate layer is sandwiched between the first and second outer layers and the holes of the first outer layer are offset from the holes of the second outer layer with the holes of the first outer layer being aligned with the first plurality of holes of the substrate layer defining first aligned holes for a sound source from a first direction and having portions of the second outer layer overlying the first aligned holes and the holes of the second outer layer being aligned with the second plurality of holes of the substrate layer defining second aligned holes for a sound source from a second direction and having portions of the first outer layer overlying the second aligned holes such that the portions of the first and second outer layer overlying respective aligned holes vibrate upon receiving sound waves from respective sound sources to permit sound to bi-directionally travel therethrough.

13. The golf cart of claim 12, wherein the outer layers are anti-microbial layers capable of cleaning surrounding air of bacteria, viruses, or other microorganisms upon contact therewith.

14. The golf cart of claim 12, wherein the substrate layer and the outer layers are plastic layers.

15. The golf cart of claim 14, wherein the plastic layers are translucent or clear/transparent.

16. The golf cart of claim 12, wherein the partition divider is rollable between an unrolled position in which the partition divider is unrolled from the roof toward the floor and a rolled position in which the partition divider is rolled up into stowage adjacent the roof.

17. The golf cart of claim 12, wherein the partition divider is cut to form a shape that aligns with a cross-sectional profile of the passenger seating area.

18. The golf cart of claim 12, wherein the partition divider includes a fastening means for the attachment to the roof of the golf cart.

19. The golf cart of claim 18, wherein the golf cart comprises a modification to facilitate the attachment via the fastening means.

20. The golf cart of claim 19, wherein the modification is selected from the group consisting of: a snap socket, a bracket, and additional holes or rods.

* * * * *